(12) United States Patent
Salin et al.

(10) Patent No.: US 6,442,386 B1
(45) Date of Patent: Aug. 27, 2002

(54) METHOD FOR DISCONNECTING A CONNECTION OF A SUBSCRIBER STATION

(75) Inventors: Hannu-Pekka Salin, Vantaa; Erkki Antero Koskinen, Palojoki, both of (FI)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 09/643,096

(22) Filed: Aug. 21, 2000

Related U.S. Application Data

(63) Continuation of application No. PCT/FI99/00136, filed on Feb. 19, 1999.

(30) Foreign Application Priority Data

Feb. 20, 1998 (FI) .................................................. 980396

(51) Int. Cl.$^7$ ................................................. H04Q 7/20
(52) U.S. Cl. ........................ 455/433; 455/435; 455/432
(58) Field of Search ........................ 455/433, 436–442, 455/444, 432, 435, 451, 422

(56) References Cited

U.S. PATENT DOCUMENTS

| | | | | |
|---|---|---|---|---|
| 5,797,094 A | * | 8/1998 | Houde et al. ........... | 455/433 X |
| 6,081,705 A | * | 6/2000 | Houde et al. ........... | 455/451 X |
| 6,108,518 A | * | 8/2000 | Madour et al. ......... | 455/422 X |
| 6,195,546 B1 | * | 2/2001 | Leung et al. ........... | 455/433 X |

FOREIGN PATENT DOCUMENTS

| | | |
|---|---|---|
| DE | 43 21 418 | 1/1995 |
| DE | 44 19 651 | 12/1995 |
| DE | 195 19 766 | 12/1996 |
| WO | WO 97/06647 | 2/1997 |
| WO | WO 97/07643 | 2/1997 |

OTHER PUBLICATIONS

M. Mouley & M. Pautet ,*GSM System For Mobile Communications 09.02*, Palaiseau, France, Aug. 1996, version 5.3.0, section 6.1.3, pp. 77–78.

M. Mouley & M. Pautet ,*GSM System For Mobile Communications 09.02*, Palaiseau, France, Aug. 1996, version 5.3.0, section 6.1.3, p. 317,327–329,391–392,434,610–611.

International Search Report for PCT/FI99/00136.

* cited by examiner

*Primary Examiner*—Tracy Legree
(74) *Attorney, Agent, or Firm*—Altera Law Group, LLC

(57) ABSTRACT

The present invention relates to a mobile communication system comprising a mobile services switching center and a visitor location register and a home location register, the information on particular subscriber stations being stored therein, and comprising means for transmitting a cancellation message to said visitor location register for removing the subscriber information on a particular subscriber station from the visitor location register. To enable the connections of the mobile station to be disconnected, the visitor location register comprises disconnection means for transmitting a predetermined disconnection message to the mobile services switching center, comprises means for disconnecting an ongoing connection of the mobile station in response to said disconnection message.

10 Claims, 2 Drawing Sheets

METHOD FOR DISCONNECTING A CONNECTION OF A SUBSCRIBER STATION

Figure 1:
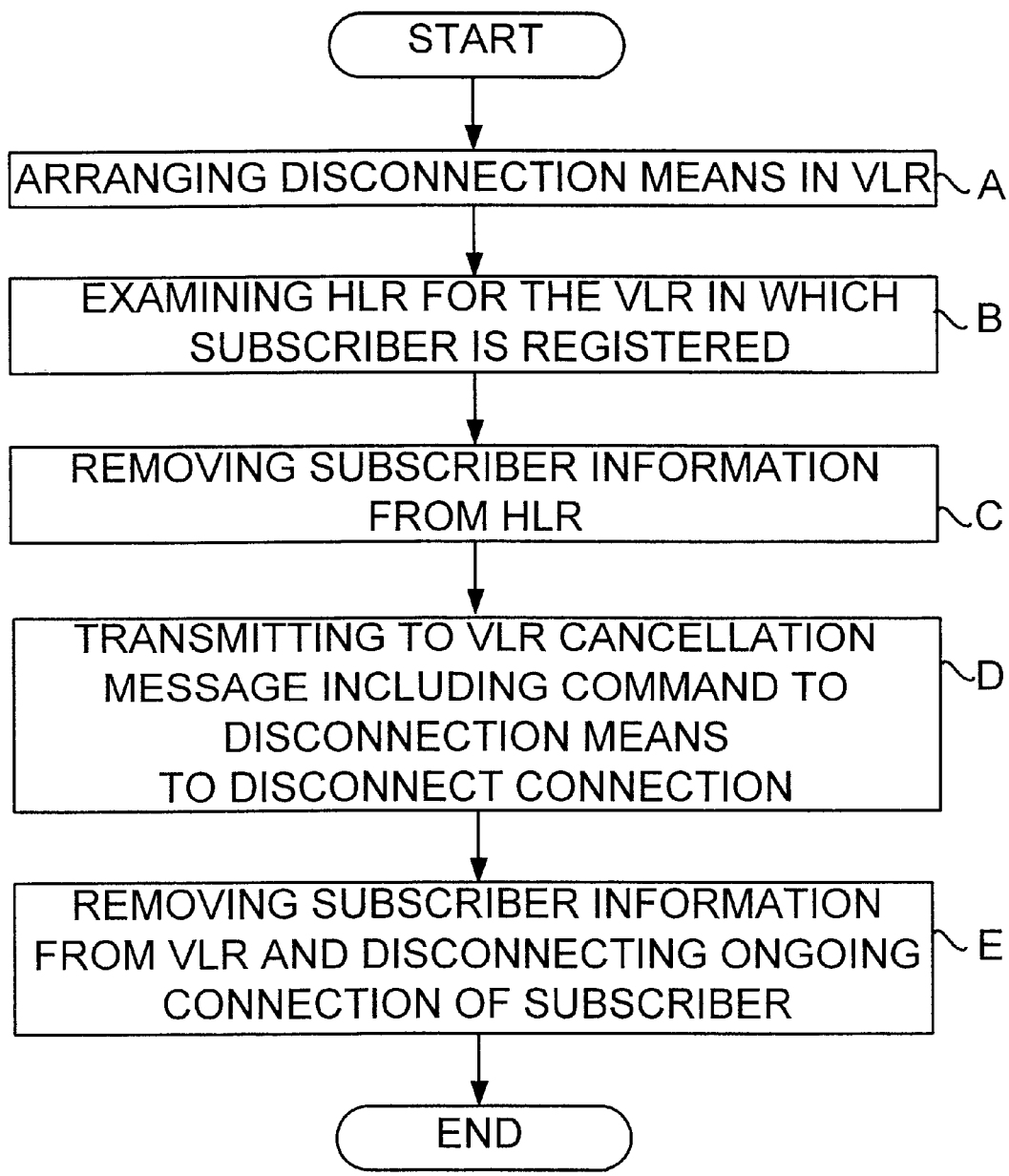

This application is a continuation of international application serial number PCT/FI99/00136, filed Feb. 19, 1999.

The present invention relates to a method for disconnecting a connection of a subscriber station in a mobile communication system comprising a mobile services switching centre and a visitor location register, which keeps a record of subscriber stations located in the coverage area of said mobile services switching centre. The invention further relates to a mobile communication system comprising: a mobile services switching centre and a visitor location register, information on subscriber stations located in the coverage area of said mobile services switching centre being stored in the visitor location register, and a home location register, information on particular subscriber stations being stored therein, and comprising means for transmitting a cancellation message to said visitor location register for removing the subscriber information on a particular subscriber station from the visitor location register.

The present invention particularly relates to a mobile communication system of the GSM (Global System for Mobile Communications) kind, in which system the subscriber information on a particular mobile station is stored both in the mobile station's unique home location register (HLR) and in the visitor location register (VLR) of the mobile services switching centre in whose coverage area the mobile station is located at the particular moment. The concept 'coverage area of a mobile services switching centre' herein refers to the geographical area which the mobile services switching centre in question serves via base stations and other network elements.

When a mobile station moves between the coverage areas of different mobile services switching centres, for instance, it becomes necessary to remove the subscriber information on the mobile station from the visitor location register corresponding to the mobile services switching centre whose coverage area the mobile station has left. In a GSM system, for instance, this can take place in such a manner that the home location register of the mobile station, which receives the information that the mobile station is located in the coverage area of a new mobile services switching centre, transmits a cancellation message to the visitor location register corresponding to the mobile services switching centre whose coverage area the mobile station has left. This removal of mobile station subscriber information from the visitor location register can be utilized also in other contexts, for example when a mobile station is completely closed (i.e. it is prevented from being used in a mobile communication system) or when the mobility of a mobile station is restricted for instance such that the mobile station is prevented from being used in the coverage area of a certain mobile services switching centre. In the last two cases, the operator can, via an interface, direct the mobile station's home location register to transmit a cancellation message to the visitor location register.

A disadvantage of the known solution described above is, however, that in some cases, to remove subscriber information from a visitor location register is not a sufficient procedure since the removal does not prevent the mobile station from continuing an ongoing connection it has at the removal moment. Removing the mobile station subscriber information from the visitor location register does not prevent the mobile station from, for instance, continuing an ongoing call at the removal moment; instead, the call continues as long as the user of the mobile station desires. This is an extremely unpleasant situation to the operator for instance when the operator would like to prevent the mobile station from incurring further costs or immediately prevent the mobile station from being used in the coverage area of a particular mobile services switching centre.

An object of the present invention is to solve the problem described above and to achieve a solution for disconnecting a connection of a particular subscriber station, i.e. a mobile station as efficiently and easily as possible, and for preventing, even more efficiently, a mobile station to be closed from incurring further costs after it has been closed. This object can be achieved by the method of the invention, characterized by comprising the steps of: arranging in said visitor location register disconnection means for transmitting a disconnection message to the mobile services switching centre corresponding to the visitor location register, and directing the disconnection means of the visitor location register to transmit the disconnection message to said mobile services switching centre for disconnecting an ongoing connection of a particular subscriber station.

The invention further relates to a mobile communication system to which the method of the invention can be applied. The mobile communication system of the invention is characterized by the visitor location register comprising disconnection means for transmitting a predetermined disconnection message to the mobile services switching centre, and the mobile services switching centre comprising means for disconnecting an ongoing connection of the subscriber station in response to said disconnection message.

The invention is based on the idea that to disconnect connections of a particular subscriber station becomes easier and more efficient when a visitor location register is equipped with means by which it is able, if necessary, to direct a mobile services switching centre to disconnect an ongoing connection of a particular subscriber station. Consequently, an ongoing connection from the mobile station can be immediately disconnected at any moment chosen by the operator.

Hence, the most significant advantages of the method and system of the invention are that the invention enables the operator to immediately disconnect a connection of a mobile station at any moment desired by the operator, whereby the mobile station avoids incurring further costs, and that the invention can be applied also to existing mobile communication systems after slight modifications since necessary modifications can be performed by software.

In a preferred embodiment of the system in accordance with the invention, only a single procedure is required from the home location register to close a particular subscriber station and to disconnect its connections. This can be achieved by adding means to the home location register by which it is able to transmit a cancellation request that includes a disconnection command to the visitor location register when the operator, for instance, removes the subscriber information on a particular subscriber from the home location register. To apply this embodiment of the present invention requires both the home location register and the visitor location register to be able to process (HLR to transmit and VLR to receive) the cancellation message that includes the disconnection command.

In another preferred embodiment of the system of the invention, parameter conditions can be stored in a visitor location register, the parameter conditions indicating how the visitor location register should operate when it receives a cancellation message. This embodiment of the invention enables the operator to determine case by case when a connection of a particular mobile station should be disconnected in connection with a received cancellation message, and when not. In other words, the visitor location register operator can determine, for example by the parameter conditions, that the visitor location register transmits a disconnection message to the mobile services switching centre whenever it receives a cancellation message originating from another operator's home location register. The advantage of this is that the connection of the mobile station can be disconnected also in situations in which the home location register of the mobile station is unable to add the disconnection command to the cancellation message.

The preferred embodiments of the method and mobile communication system of the invention are disclosed in the attached claims.

Figure 2:
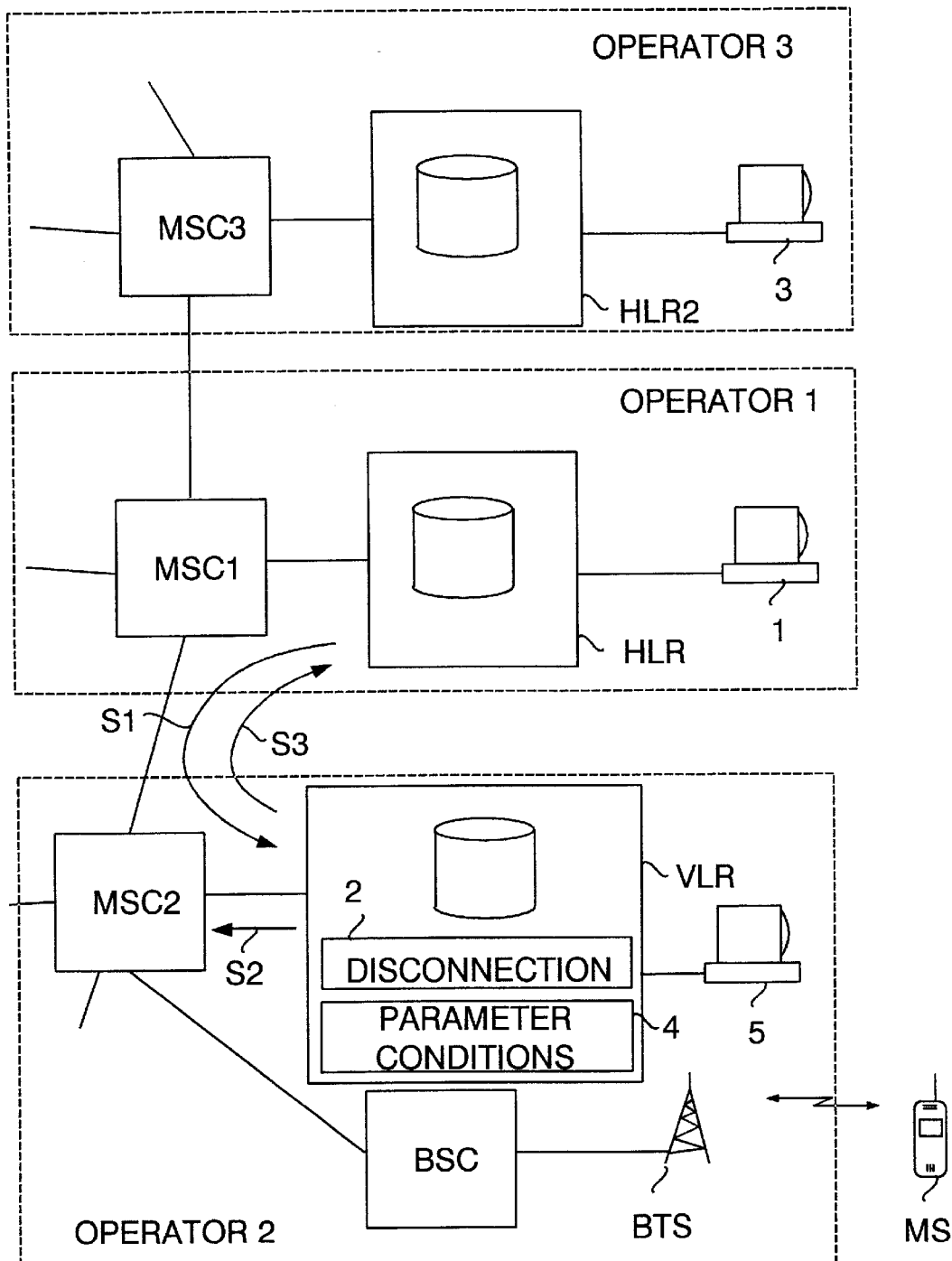

The invention will be described in closer detail in the following by way of example with reference to the accompanying drawings; in which FIG. 1 shows a flow diagram of a first preferred embodiment of the method in accordance with the invention, and FIG. 2 shows a block diagram of a first preferred embodiment of a mobile communication system of the invention.

FIG. 1 shows a flow diagram of a first preferred embodiment of the method in accordance with the invention. The flow diagram of FIG. 1 can be applied, for example, to the procedure of completely closing a subscriber interface of a GSM mobile communication system, in which case the subscriber station is prevented from being used in the network, and, simultaneously, an ongoing connection from the subscriber station is disconnected.

In block A, disconnection means are added to a visitor location register VLR, the disconnection means being able to transmit a request to disconnect a connection of a particular mobile station to a mobile services switching centre associated with the visitor location register. In practice, all visitor location registers of the system should be equipped with disconnection means to enable a particular mobile station to be closed regardless of the network part in which the mobile station is located at the moment of closure.

In block B, the home location register HLR of the mobile station to be closed is examined for the location of the mobile station. In other words, in the GSM system, information on the visitor location register in which the mobile station was last registered (by performing a location updating procedure) is stored in the home location register for the mobile station.

In block C, the information on the mobile station to be closed is removed from the home location register HLR. The operator can perform this procedure from the network management centre, for example.

In block D, a cancellation message is transmitted to the visitor location register (in which the mobile station was last registered). The cancellation message can consist of a MAP_CANCEL_LOCATION request according to the 09.02 GSM specifications. In accordance with the invention, to the request is added a disconnection command, which makes the disconnection means of the visitor location register VLR to request the mobile services switching centre associated with it to disconnect an ongoing connection of a particular mobile station. In accordance with the invention, the disconnection command to be added to the cancellation message can also indicate the connection types desired to be disconnected, such as:

calls originating from the mobile station,
calls terminating in the mobile station,
short messages transmitted to the mobile station,
short messages to be transmitted from the mobile station,
etc.

If desired, the operator can thus determine, for instance, that only connections that incur costs to the mobile station to be closed are immediately disconnected.

In block E, the visitor location register which received the cancellation request removes the information on the mobile station to be cancelled from the visitor location register VLR, and disconnects the ongoing connection. According to part 09.02 of the GSM specifications, the visitor location register VLR also acknowledges the cancellation request by transmitting a MAP_CANCEL_LOCATION_ACK message to the home location register.

FIG. 2 shows a block diagram of a first preferred embodiment of a mobile communication system of the invention. The mobile communication system shown in FIG. 1 can be a GSM system, for example. The GSM system and its structure are discussed in closer detail for example in *The GSM System for Mobile Communications* by M. Mouly & M. Pautet, Palaiseau, France, 1992, ISBN 2-9507190-0-0-7.

The system shown in FIG. 2 comprises network parts of three different operators. In the case of FIG. 2, it is assumed that a home location-register HLR of an operator 1 is the home location register of a mobile station MS, in which case the subscriber information on the mobile station MS can be found in the home location register HLR.

In the case of FIG. 2, the mobile station MS is located in the coverage area of a mobile services switching centre MSC2, in other words there is an ongoing call from the mobile station via a base station BTS, a base station controller BSC and the mobile services switching centre MSC2 to a subscriber station (not shown in FIG. 2) of a fixed telephone network, for example. In consequence, the subscriber information on the mobile station is also stored in the visitor location register VLR. Furthermore, the home location register HLR includes information that the information on the mobile station MS can be found expressly in the visitor location register VLR.

When the operator 1 desires to close the mobile station MS from a network management centre 1, the operator 1 removes the information on the mobile station MS from the home location register HLR. This makes the home location register to transmit a cancellation message S1 to the visitor location register VLR in which the mobile station MS is registered. The home location register HLR adds the disconnection command to the cancellation message S1. The cancellation message can consist of, for example, a MAP_CANCEL_LOCATION message according to part 09.02 of the GSM specifications, and, in accordance with the invention, the disconnection command is added to the message.

When the visitor location register VLR has received the cancellation message S1, disconnection means 2 of the visitor location register identify the disconnection command included in the message S1. The disconnection means 2 then request the mobile services switching centre MSC2 to examine, by means of a disconnection message S2, whether the mobile station MS has an ongoing connection at the moment; if so, the connection should be disconnected.

When the mobile services switching centre MSC2 has disconnected the ongoing call of the mobile station MS in a manner known per se, and the visitor location register VLR has removed the information on the mobile station MS, the visitor location register VLR acknowledges the cancellation request by transmitting the MAP_CANCEL_LOCATION_ACK message S3 to the home location register HLR.

In the case of FIG. 2, it is assumed that a home location register HLR2 of an operator 3 is unable to add the disconnection command to the cancellation messages it transmits. In consequence, an operator 2 has stored parameter conditions 4 in its visitor location register VLR. The parameter conditions determine, for instance, that the disconnection means 2 transmit the disconnection message S2 to the mobile services switching centre MSC2 whenever the visitor location register receives a cancellation message, in other words a MAP_CANCEL_LOCATION message from the home location register HLR2.

When the operator 3 thus wants to close a mobile station (not shown in the figure) whose home location register is HLR2 and which is located in the coverage area of the mobile services switching centre MSC3, the operator 3 directs, via a user interface 3, the home location register HLR2 to transmit a cancellation message concerning the mobile station in question. The register transmits a corresponding cancellation message HLR2 also when it receives information from some other visitor location register that the mobile station has entered the coverage area of a mobile services switching centre corresponding to said other visitor location register. Since the home location register HLR2 includes information that the mobile station is located in the coverage area of the mobile services switching centre MSC2 corresponding to the visitor location register VLR, the home location register transmits a MAP_CANCEL_LOCATION message according to part 09.02 of the GSM specifications, i.e. a cancellation message particularly to the visitor location: register VLR.

When the visitor location register VLR receives the cancellation message from the home location register HLR, it operates as described above, in other words it detects that the parameter conditions stored in the visitor location register VLR by the operator 2 require that the information on the mobile station in question should be removed, and the disconnection message S2 concerning the mobile station should be transmitted to the mobile services switching centre MSC2.

Furthermore, the operator 2 is enabled to disconnect a connection of a mobile station located in its coverage area in the case of FIG. 2. In other words, if the operator wants to disconnect a connection of a particular mobile station for some reason, the operator can, via a terminal 5, direct the visitor location register VLR to transmit the disconnection message S2 concerning the mobile station to the mobile services switching centre MSC2.

In all cases described above, the disconnection message S2 can include additional information to indicate the connection types the mobile services switching centre MSC2 should disconnect. In other words, by the disconnection message the visitor location register VLR can request the mobile services switching centre MSC2 to disconnect, for instance, only those ongoing calls of a particular mobile station that incur costs to the mobile station concerned.

It is to be understood that the above description and the accompanying drawings are only intended to illustrate the present invention. Therefore, the invention can also be applied to other mobile communication systems than the GSM system described above by way of example. It will be obvious to those skilled in the art that the invention can be varied and modified in many ways without departing from the scope and spirit of the invention disclosed in the attached claims.

What is claimed is:

1. A mobile communication system comprising:
   a mobile services switching centre having means for disconnecting an ongoing connection of a subscriber station in response to a disconnection message,
   a visitor location register having parameter conditions and information on subscriber stations located in the coverage area of the mobile services switching centre being stored in the visitor location register, the visitor location register having disconnection means for transmitting a predetermined disconnection message to the mobile services switching centre in response to the reception of a cancellation message, if the parameter conditions are met or if the cancellation message includes a disconnection command,
   a home location register, information on particular subscriber stations being stored therein, and comprising means for adding a predetermined disconnection command to the cancellation message to be transmitted to the visitor location register, and means for transmitting the cancellation message to the visitor location register for removing subscriber Information of a particular subscriber station from the visitor location register, the home location register being arranged to transmit the cancellation message that includes the disconnection command to the visitor location register in response to the removal of the subscriber information on the subscriber station from the home location register, and
   a user interface via which an operator is able to remove the information on a particular subscriber station from the home location register.

2. The mobile communication system according to claim 1, wherein the mobile communication system being a GSM system, and the cancellation message consisting of a MAP_CANCEL_LOCATION message according to part 09.02 of the GSM specifications.

3. A mobile communication system comprising:
   a mobile services switching centre having means for disconnecting an ongoing connection of a subscriber station in response to a disconnection message,
   a visitor location register having parameter conditions and information on subscriber stations located in the coverage area of the mobile services switching centre being stored in the visitor location register, the visitor location register having disconnection means for transmitting a predetermined disconnection message to the mobile services switching centre in response to the reception of a cancellation message, if the parameter conditions are met or if the cancellation message includes a disconnection command,
   a home location register, information on particular subscriber stations being stored therein, and comprising means for adding a predetermined disconnection command to the cancellation message to be transmitted to the visitor location register, and means for transmitting the cancellation message to the visitor location register for removing subscriber information of a particular subscriber station from the visitor location register, and
   a user interface via which an operator is able to direct the home location register to transmit the cancellation message that includes the disconnection command to the visitor location register.

4. The mobile communication system according to claim 3, wherein the mobile communication system being a GSM system, and the cancellation message consisting of a MAP_CANCEL_LOCATION message according to part 09.02 of the GSM specifications.

5. A mobile communication system comprising:
   a mobile services switching centre having means for disconnecting an ongoing connection of a subscriber station in response to a disconnection message, a visitor location register having parameter conditions and information on subscriber stations located in the coverage area of the mobile services switching centre being stored in the visitor location register, the visitor location register having disconnection means for transmitting a predetermined disconnection message to the mobile services switching centre in response to the reception of a cancellation message, if the parameter conditions are met, the disconnection means of the visitor location register being arranged to indicate to the mobile services switching centre by the disconnection message the type of connections that the mobile services switching centre should disconnect, and a home location register, information on particular subscriber stations being stored therein, and comprising means for transmitting the cancellation message to the visitor location register for removing subscriber information of a particular subscriber station from the visitor location register.

6. The mobile communication system according to claim 5, wherein the home location register having means for adding a predetermined disconnection command to the cancellation message to be transmitted to the visitor location register, and the disconnection means of the visitor location register being arranged to transmit the disconnection message to the mobile services switching centre in response to the reception of the cancellation message that includes the disconnection command.

7. The mobile communication system according to claim 6, wherein the system further comprising a user interface via which an operator is able to remove the information on a particular subscriber station from the home location register, and the home location register being arranged to transmit the cancellation message that includes the disconnection command to the visitor location register in response to the removal of the subscriber information on the subscriber station from the home location register.

8. The mobile communication system according to claim 6, wherein the mobile communication system comprising a plurality of mobile services switching centres and a plurality of visitor location registers, the information on subscriber stations located in the coverage area of the corresponding mobile services switching centre being stored in each visitor location register, and the home location register being arranged to transmit the cancellation message that includes the disconnection command to the visitor location register indicated by the information stored in the home location register when the home location register receives information indicating that the subscriber station is located in the coverage area of some other mobile services switching centre than in the coverage area of the mobile services switching centre corresponding to the visitor location register.

9. The mobile communication system according to claim 6, wherein the system further comprising a user interface via which an operator is able to direct the home location register to transmit the cancellation message that includes the disconnection command to the visitor location register.

10. The mobile communication system according to claim 5, wherein the mobile communication system being a GSM system, and the cancellation message consisting of a MAP_CANCEL_LOCATION message according to part 09.02 of the GSM specifications.

* * * * *